United States Patent
Ellis et al.

(10) Patent No.: US 8,553,353 B2
(45) Date of Patent: Oct. 8, 2013

(54) NEUTRALIZATION OF STATIC CHARGE ON MAGNETIC TAPE

(75) Inventors: Michael Ellis, Boise, ID (US); Mike Holmberg, Eagle, ID (US); Eric Petersen, Boise, ID (US); Paul W Poorman, Meridian, ID (US); Geoff Spratt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 13/315,982

(22) Filed: Dec. 9, 2011

(65) Prior Publication Data

US 2013/0148238 A1    Jun. 13, 2013

(51) Int. Cl.
  *G11B 5/39* (2006.01)
(52) U.S. Cl.
  USPC .......................................................... 360/90
(58) Field of Classification Search
  USPC .......................................................... 360/90
  See application file for complete search history.

(56) References Cited

U.S. PATENT DOCUMENTS

| | | | |
|---|---|---|---|
| 6,704,174 B2 * | 3/2004 | Soda et al. | 360/323 |
| 7,295,402 B2 | 11/2007 | Okawa et al. | |
| 7,486,475 B2 | 2/2009 | Biskeborn | |
| 7,742,252 B2 | 6/2010 | Biskeborn et al. | |

FOREIGN PATENT DOCUMENTS

| | | |
|---|---|---|
| JP | 2006278750 | 10/2006 |
| JP | 2010103439 | 5/2010 |

* cited by examiner

*Primary Examiner* — Mark Blouin

(57) ABSTRACT

Methods and apparatus are provided related to magnetic recording tape. One or more ion emitters are disposed in non-contacting proximity to a passing recording tape. Static electric charges born on the tape are neutralized prior to passing the tape in contact with a read-write head. Migration of chemical constituency from the tape to the head is prevented or significantly reduced with a corresponding elimination or reduction of related problems.

15 Claims, 4 Drawing Sheets

NEUTRALIZATION OF STATIC CHARGE ON MAGNETIC TAPE

BACKGROUND

Magnetic recording tape has been used for many years for storage and retrieval of analog and digital information. Information is stored on such a tape by passing it over a recording head that produces a modulated electromagnetic field, arranging magnetizable particles born by the tape. The tape is later passed over a playback head—which can be the same as the recording head—that derives an electrical signal corresponding to the recorded information by way electromagnetic induction, magnetoresistive response or other dynamics.

However, drawing the tape from a supply reel and gathering it on a take-up reel are respective actions that can result in static electric charge on the surface of the tape. Transfer of this charge, or a portion thereof, to the recording/playback head and then to electrical ground can cause migration and gradual depletion of the chemical constituents on the magnetic tape, resulting in storage media degradation. Furthermore, such chemicals can accumulate on the head resulting in significant performance loss due to increased spacing between the head and the tape media. The present teachings address these and related concerns.

BRIEF DESCRIPTION OF THE DRAWINGS

The present embodiments will now be described, by way of example, with reference to the accompanying drawings, in which.

DETAILED DESCRIPTION

Introduction

Figure 1:
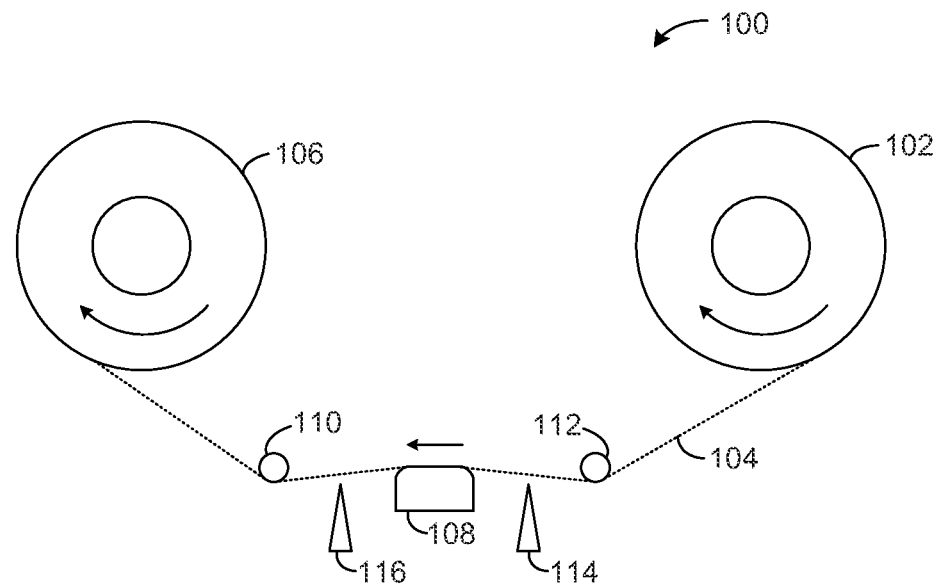
FIG. 1 is a schematic view of a tape recording apparatus according to one example of the present teachings.

Apparatus and methods are provided related to magnetic recording tape. One or more ion emitters are disposed in non-contacting proximity to a recording tape that passes by during normal operations. Static electric charges born on the tape are neutralized prior to passing the tape in contact with a read-write head. Migration of chemical constituency from the tape to the head is prevented or significantly reduced with a corresponding elimination or reduction of related problems.

In one example, an apparatus includes a head configured to record information on, or retrieve information from, or both, a magnetic recording tape The apparatus also includes an ion emitter configured to neutralize a static electric charge on the magnetic recording tape prior to its passage over the head.

In another example, a method includes neutralizing a static charge on a recording tape by way of an ion emitter.
First Illustrative Tape Recording Apparatus Reference is now directed to FIG. 1, which depicts a schematic view of a tape recording apparatus (apparatus) 100. The apparatus 100 is illustrative and non-limiting with respect to the present teachings. Thus, other tape recording apparatus, devices and systems can be configured, formed or used in accordance with the present teachings.

The apparatus 100 includes a supply reel 102. The supply reel 102 is configured to store a quantity of magnetic recording tape (tape) 104 in an overlappingly wound or "spooled" manner. The apparatus 100 also includes a take-up reel 106 configured to gather or accumulate the tape 104 as it is progressively drawn from the supply reel 102 and transported along a pathway. The progressive transfer of the tape 104 from the supply reel 102 to the take-up reel 106 is referred to as a "forward" operation of the apparatus 100. Conversely, transferring the tape 104 from the take-up reel 106 back to the supply reel 102 is referred to as a "reverse" operation.

The apparatus 100 also includes a read/write head (head) 108. The head 108 is also referred to as a recording/playback head 108 for purposes of the present teachings. The head 108 is configured to store information on and retrieve information from the tape 104 as it is passes in contact therewith.

Specifically, the head 108 is driven by electrical signaling and produces a modulated electromagnetic field. The modulated field aligns magnetic particles within chemical constituency of the tape 104 in accordance with information (analog or digital) to be recorded during a write operation. In turn, the head 108 generates (or derives) an electrical signal corresponding to information stored on the tape 104 during a read operation. Thus, the head 108 performs both read and write functions (i.e., playback and record).

The apparatus 100 also includes a pair of rollers 110 and 112, respectively. The rollers 110 and 112 are disposed about opposite sides of the head 108 and are configured to maintain contact between the tape 104 and the head 108 during forward or reverse operations. The apparatus further includes respective on emitters 114 and 116. The ion emitter 114 is disposed between the head 108 and the supply reel 102, while the on emitter 116 is disposed between the head 108 and the take-up reel 106. The ion emitters 114 and 116 are respectively configured to neutralize or mitigate a static electric charge that is present on the tape 104 before it passes over the head 108, depending upon the present mode of operation (forward or reverse).

Normal operation of the apparatus 100 is generally as follows: motor-driven rotation of the take-up reel 106 causes the tape 104 to be drawn from the supply reel 102. The tape 104 is transported in passing contact with the head 108 by virtue of the rollers 110 and 112, respectively. The head 108 can be used for either reading or writing operations as the tape 104 passes thereby.

Withdrawal of the tape 104 from the supply reel 102 causes static electric charge to form on the tape 104 outer surfaces by way of tribo-electric phenomena. Such static electric charge would normally be drawn off toward ground potential during contact with the head 108, resulting in gradual depletion of the chemical constituency of the magnetic recording tape 104 and undesirable build-up on the head 108.

However, in this non-limiting illustration, the ion emitter 114 provides a stream of charged particles carried by an induced air flow over the tape 104, neutralizing the static electric charge and resulting in (about) zero net charge on the tape 104. This charge neutralization process is performed on the passing tape 104 just prior to contact with the head 108. The neutralized tape 104 thereafter contacts the head 108 such that information is read from or written to the tape 104 without undesirable effects that could otherwise have occurred.

The ion emitter 116 is typically (but not necessarily) unused during the forward operation described above. Rather, the ion emitter 116 is used during reverse operations when the tape 104 is being transported from the take-up reel 106 to the supply reel 102. During such reverse operations, the ion emitter 114 is typically (but not necessarily) unused. In another non-limiting example, the ion emitter 114 and the ion emitter are both used during either forward or reverse operations. Other operating scenarios are also contemplated in accordance with the present teachings.

In one example, the supply reel 102 and the take-up reel 106 are discrete entities and disposed such that a reel-to-reel configuration is defined. In another example, the supply reel 102 and the take-up reel 106 are respective features or portions of a cassette or cartridge entity. Other suitable configurations can also be used.

Second Illustrative Tape Recording Apparatus

Figure 2:
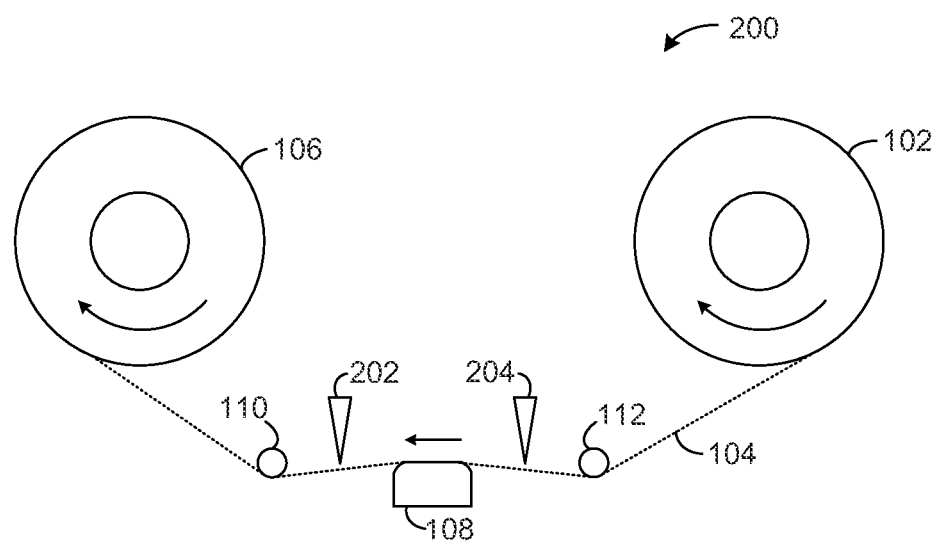
FIG. 2 is a schematic view of a tape recording apparatus according to another example.

Reference is now directed to FIG. 2, which depicts a schematic view of a tape recording apparatus (apparatus) 200. The apparatus 200 is illustrative and non-limiting with respect to the present teachings. Thus, other tape recording apparatus, devices and systems can be configured, formed or used in accordance with the present teachings.

The apparatus 200 includes the supply reel 102, magnetic recording tape 104, take-up reel 106, read/write head 108 and the rollers 110 and 112 as respectively introduced and described above. The apparatus 200 also includes an on emitter 202 and an on emitter 204. The respective ion emitters 202 and 204 are disposed on an opposite side of the tape 104 with respect to the ion emitters 114 and 116 described above. The ion emitters 202 and 204 function substantially as described above so as to neutralize static electric charge present on the tape 104 before it encounters the head 108.

First Illustrative System

Figure 3:
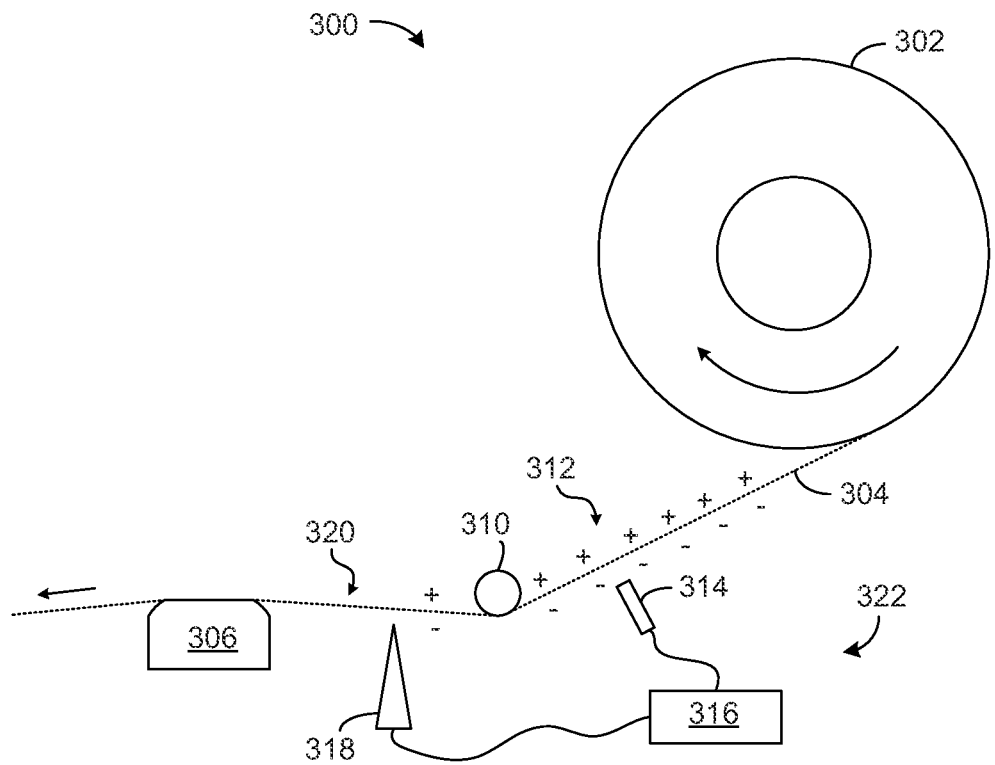
FIG. 3 depicts a schematic view a system according to yet another example.

Reference is now made to FIG. 3, which depicts a system 300. The system 300 is illustrative and non-limiting in nature. Other systems having other respective characteristics or operating in accordance with other scenarios can also be used.

The system 300 includes a supply reel 302 supporting a quantity of magnetic recording tape (tape) 304. The tape 304 is being drawn away from the supply reel 302 and routed in contact with a head 306. The head 306 is configured to store and retrieve information on the tape 304 by way of electromagnetic signaling. The tape 304 is routed over and in contact with the head 308 by way of a roller 310.

A static electric (i.e., tribo-electric) charge accumulates on a portion 312 of the tape 304 as it is drawn from the supply reel 302. The field strength (i.e., intensity) of this charged portion 312 is detected by a sensor 314. In one example, the sensor 314 is an inductive-type electric field sensor. Other sensor 314 types can also be used. The sensor 314 provides a signal corresponding to the detected field strength.

The system 300 also includes a controller 316. The controller 316 can be defined by or include any suitable electronic constituency. The controller 316 is configured to receive the signal from the sensor 314 and to provide a corresponding output control signal to an ion emitter 318. The system 300 further includes the ion emitter 318, which is configured to receive the control signal from the controller 316 and to provide a corresponding stream of charged particles directed toward the tape 304.

The ion flow or stream from the ion emitter 318 functions to neutralize or mitigate the charge born by the tape 304, resulting in a charge-neutralized portion 320 that passes in contact with the head 308. Thus, the system 300 includes an open-loop control system 322 defined by the sensor 314, the controller 316 and the ion emitter 318.

The control system 322 is configured to mitigate charge born on the tape 304 as the system 300 operates in a forward direction or mode. The present teachings also contemplate analogous control systems that operate in a reverse mode, as well. Other configurations and operating schema can also be used.

Illustrative Ion Emitter Array

Figure 4:
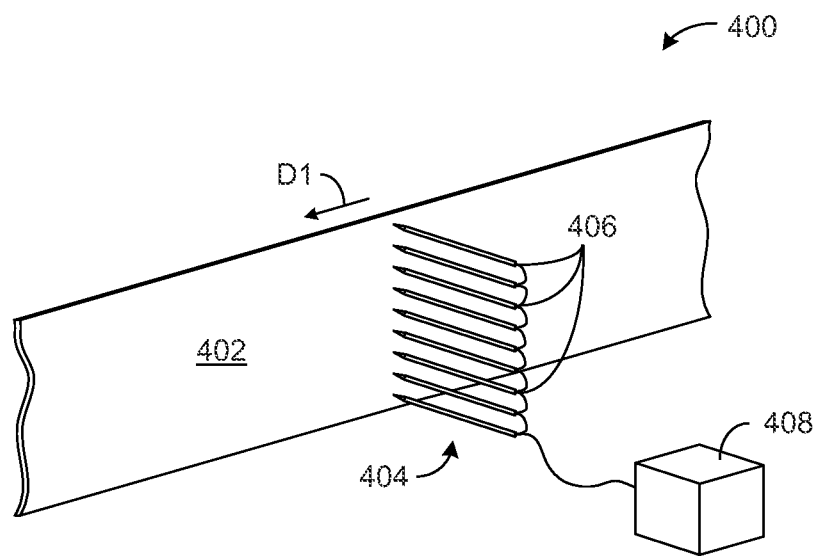
FIG. 4 is an isometric-like view of an arrangement including an ion emitter array according to one example.

Reference is now made to FIG. 4, which depicts an isometric-like view of an arrangement 400. The arrangement 400 and features thereof are illustrative and non-limiting with respect to the present teachings. Other arrangements having other respective features are also contemplated by the present teachings.

The arrangement 400 includes a portion of a magnetic recording tape (tape) 402 that is being transported in a direction "D1" as indicated by the arrow. The arrangement 400 also includes an array of ion emitters (array) 404. The array 404 includes a plurality of individual ion emitters 406 disposed in near, non-contacting adjacency to the tape 402. Each of the ion emitters 406 is defined by an elongated, needle-like form factor.

The arrangement 400 also includes a high-voltage power supply (HVPS) 408. The HVPS 408 is configured to provide a controlled source of direct-current (DC) potential that is electrically coupled to each of the ion emitters 406 of the array 404. In one embodiment, the HVPS 408 is controlled by a controller (e.g., 316) such that an open-loop control scheme is defined. Other configurations can also be used. In one example, the HVPS 408 provides 10,000 Volts DC potential to the array 404. Other suitable voltages can also be used.

During typical, normal operation, the ion emitters 406 direct a flow of electrical charge (i.e., electrons), borne by an electrically induced air flow, toward the tape 402 so as to neutralize the static charge born thereon. The tape 402 is then understood to continue past the array 404 and on to a read/write head (e.g., 306). Chemical depletion from the tape 402 and corresponding deposition onto a head are eliminated (or nearly so) by way of the operation of the arrangement 400.

Third Illustrative Tape Recording Apparatus

Figure 5:
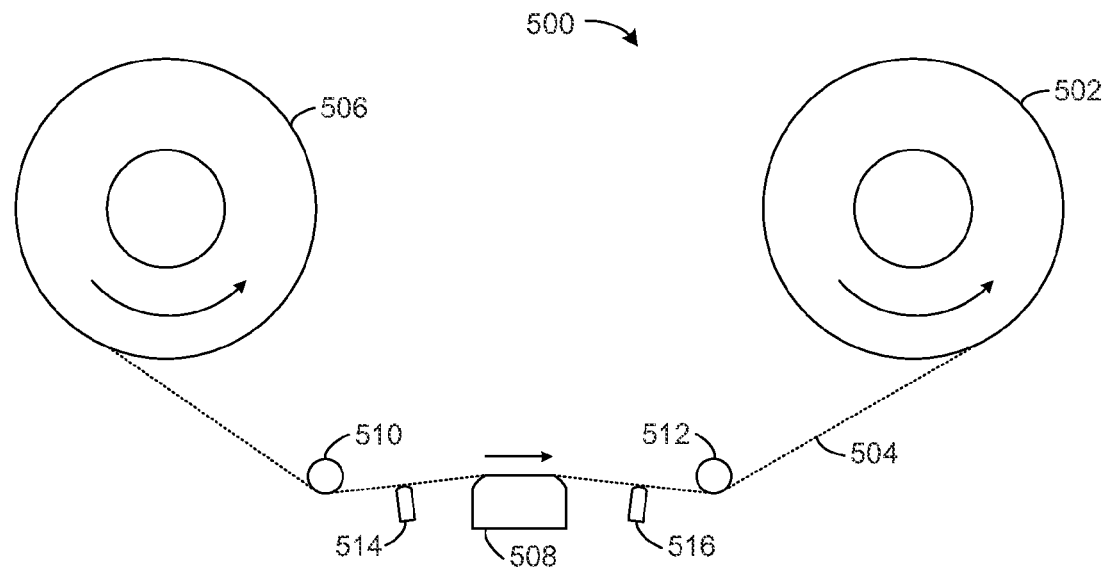
FIG. 5 is a schematic view of a tape recording apparatus according to still another example.

Reference is now made to FIG. 5, which depicts a schematic view of a tape recording apparatus (apparatus) 500. The apparatus 500 is illustrative and non-limiting with respect to the present teachings. Thus, other tape recording apparatus, devices and systems can be configured, formed or used in accordance with the present teachings.

The apparatus 500 includes a supply reel 502. The supply reel 502 configured to store a quantity of magnetic recording tape (tape) 504. The apparatus 500 also includes a take-up reel 506. As depicted, the tape 504 is being drawn from the take-up reel 506 and transported to the supply reel 502 in a "reverse" mode. Operation of the apparatus 500 in a forward mode is also contemplated by the present teachings.

The apparatus 500 also includes a read/write head (head) 508. The head 508 is configured to store information on and retrieve information from the tape 504 as it is passes in contact with the head 508. The apparatus 500 also includes a pair of rollers 510 and 512, respectively. The rollers 510 and 512 are disposed about opposite sides of the head 508 and configured to maintain contact between the tape 504 and the head 508 during forward or reverse operations.

The apparatus further includes respective contacting electrodes 514 and 516. The electrodes 514 and 516 are also referred to as contact bars 514 and 516, respectively, for purposes of the present teachings. The electrode 514 is disposed between the head 508 and the take-up reel 506, while the electrode 516 is disposed between the head 508 and the supply reel 516. The electrodes 514 and 516 are respectively configured to neutralize or mitigate a static electric charge present on the tape 504 before it passes over the head 508, depending upon the present mode of operation (forward or reverse).

Withdrawal of the tape 504 from the take-up reel 506 causes static electric charge to form on the tape 504 by way of tribo-electric effects. The electrode 514 provides an electrical pathway for static electric charge to be dissipated to ground potential (i.e., charge bleed-off). This charge neutralization process is performed on the passing tape 504 just prior to contact with the head 508.

In one operating scenario, the respective electrodes 514 and 516 are both used during either forward or reverse operations. In another operating scenario, only the electrode 516 is used during forward operations when the tape 504 is being transported from the supply reel 502 to the take-up reel 506. Other operating scenarios are also contemplated in accordance with the present teachings.

Second Illustrative System

Figure 6:
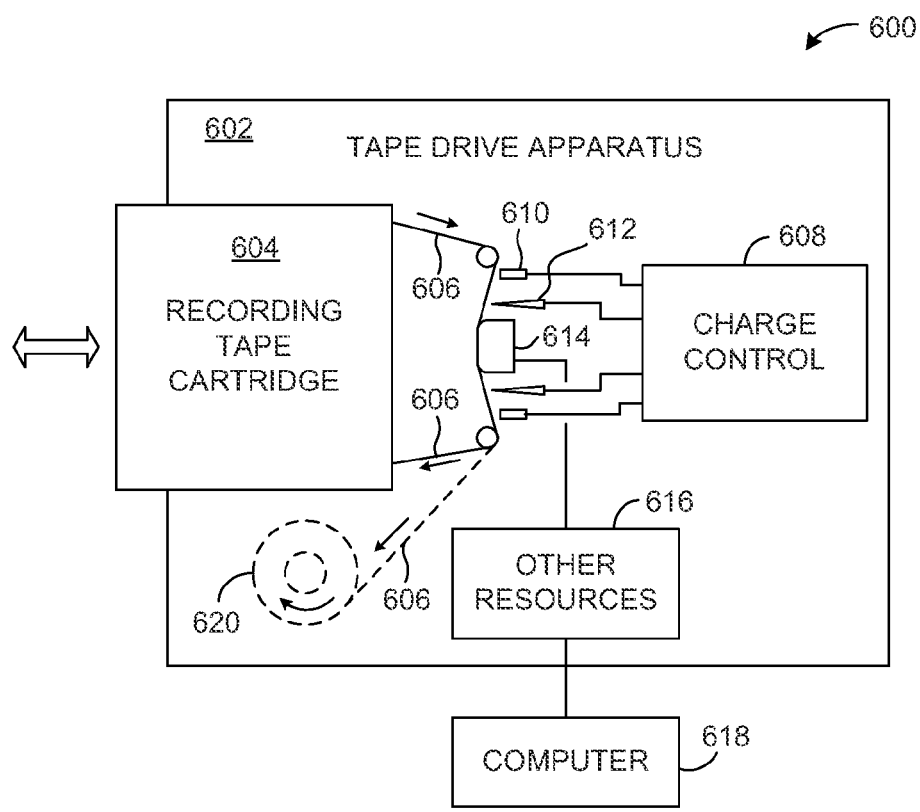
FIG. 6 is a block diagram of a system according to another example of the present teachings.

Attention is directed to FIG. 6, which depicts a block diagram of a system 600 according to another example of the present teachings. The system 600 is illustrative and non-limiting in nature. Other systems, devices, configurations and operations are also contemplated by the present teachings.

The system 600 includes a tape drive apparatus (drive) 602. The drive 602 is configured to removably receive a cartridge 604 that houses (i.e., stores or encloses) a magnetic recording tape (tape) 606. In one example, the tape 606 is used to store digital information such as computer-readable files, computer-executable program code, and the like. Other information storage scenarios can also be used.

The drive 602 also includes a static charge control (control) 608. The control 608 is configured to sense static electric charge born by the tape 606 by way of corresponding sensors 610. The control 608 is also configured to control operation of corresponding ion emitters 612 so as to mitigate static electric charge on the tape 606. Such charge neutralization is performed prior to passage of the tape 606 over a read-write head 614.

The drive 602 further includes other resources 616. Such other resources can include any resources required or desired for normal operations of the drive 602. Non-limiting examples of other resources 616 include a power supply, network communications circuitry, read and write signaling circuitry coupled to the read-write head 614, and so on. Other resources or constituency can also be used.

in one example, the other resources 616 include input/output (I/O) circuitry configured for bidirectional communication between the drive 602 and a computer 618. As such, the other resources 616 can receive digital data from the computer 618 and store that data on the tape 606, and retrieve digital data from the tape 606 that is communicated to the computer 618. Other operations and uses can also be performed.

In an alternative example, the drive 602 includes a take-up reel 620 that accumulates the tape 606 after it passes over the read-write head 614 during forward operation. In such an alternative, the cartridge 604 includes only a supply reel (e.g., 102) from which the tape 606 is drawn during forward operation, and which accumulates the tape 606 during reverse operation. Other suitable configurations can also be used.

Illustrative Method

Figure 7:
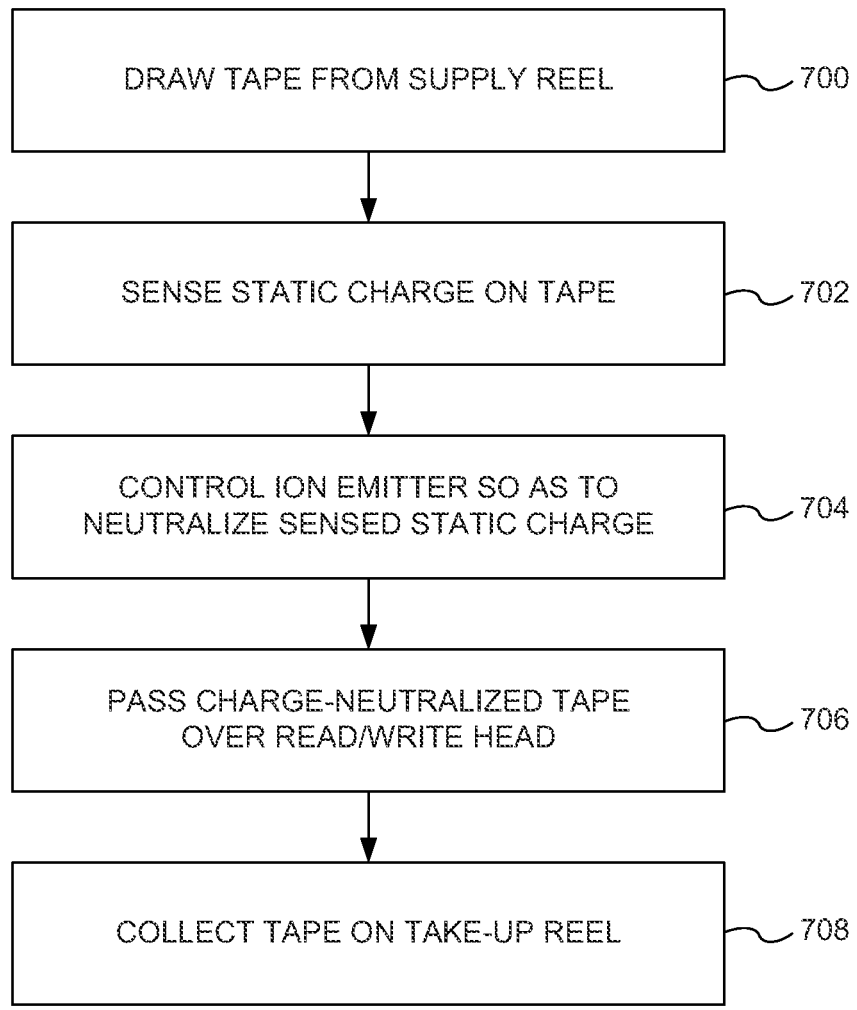
FIG. 7 is a flow diagram of a method according to the present teachings.

Reference is made now to FIG. 7, which depicts a flow diagram of a method according to the present teachings. The method of FIG. 7 includes particular operations and order of execution. However, other methods including other operations, omitting one or more of the depicted operations, and/or proceeding in other orders of execution can also be used according to the present teachings. Thus, the method of FIG. 7 is illustrative and non-limiting in nature. Reference is also made to FIGS. 1 and 3 in the interest of understanding the method of FIG. 7.

At 700, tape is drawn from a supply reel. For purposes of a present example, a magnetic recording tape 304 is drawn from a supply reel 302 by way of a motor-drive action. The process of drawing the tape 304 from the supply reel 302 results in a static electric charge on a portion 312 of the tape 304.

At 702, the static charge on the tape is sensed. For purposes of the present example, a sensor 314 senses the static electric charge on the portion 312 and provides a corresponding signal. The signal is provided to a controller 316.

At 704, on emitters are controlled so as to neutralize the sensed static charge. In the present example, the controller 316 controls operations of one or more on emitters 318 so as to mitigate or neutralize the static charge on the portion 312 as detected by the sensor 314. The controller 316 can activate and modulate the operation of the on emitter(s) 318 in accordance with the intensity of the sensed static charge so that about zero net static charge remains.

At 706, the charge-neutralized tape is passed over a read-write head. In the present example, a portion 320 of the tape 304 having been charge-neutralized is passed over a read-write head 306. The read-write head 306 can be used to record (or retrieve) information to (or from) the tape 304 by way of electromagnetic signaling.

At 708, the tape is collected on a take-up reel. For purpose of the present example, the tape 304, having passed the read-write head 306, is now accumulated on a take-up reel (e.g., 106).

In general, and without limitation, the present teachings contemplate various apparatus, systems, devices and methods for neutralizing (or mitigating) static electric charge born on the surface of a magnetic recording tape. Typically, tape is drawn from a supply reel and transported or routed along a pathway where after it is accumulated on a take-up reel. The tape is routed in passing contact with a read-write head configured to store information on and retrieve information from the tape by way of electromagnetic signaling.

Drawing the tape from the supply reel results in a static electric charge on the surface of the tape by virtue of tribo-electric phenomena. The reverse is also true—drawing tape from the take-up reel can also result in static electric charge on the surface of the tape. This electric charge is neutralized by ion emitters or other means according to the present teachings prior to contact of the tape with the read-write head. Migration of chemical constituency from the tape to the head is prevented (or essentially so) as a result of the charge neutralization operation. The charge neutralization processes can be performed during forward or reverse operations of the tape recording system.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
   a head configured to at least record information on or retrieve information from a magnetic recording tape; and
   an on emitter configured to neutralize a static electric charge on the magnetic recording tape prior to passage over the head.

2. The apparatus according to claim 1 further comprising a sensor configured to provide a signal corresponding to the static electric charge on the magnetic tape.

3. The apparatus according to claim 2 further comprising a controller configured to control operation of the ion emitter in accordance with the signal.

4. The apparatus according to claim 1, the ion emitter including a plurality of extensions disposed in non-contacting proximity to the magnetic recording tape.

5. The apparatus according to claim 1, the ion emitter disposed so as to neutralize the static electric charge on the magnetic recording tape during a forward operation of the apparatus.

6. The apparatus according to claim 1, the on emitter disposed so as to neutralize the static electric charge on the magnetic recording tape during a reverse operation of the apparatus.

7. The apparatus according to claim 1, the on emitter disposed so as to neutralize the static electric charge by way of indirect contact with the magnetic tape.

8. The apparatus according to claim 1, the ion emitter disposed relative to a supply side of the head, the apparatus further comprising another ion emitter disposed relative to a take-up side of the head.

9. The apparatus according to claim 1, the apparatus configured to operate by way of a removable cartridge including the magnetic recording tape.

10. A method, comprising:
    neutralizing a static charge on a recording tape by way of an on emitter.

11. The method according to claim 10, the neutralizing the static charge performed prior to passing the recording tape over a head.

12. The method according to claim 10, further comprising transporting the recording tape such that a charge-neutralized portion of the tape is in contact with a head during the neutralizing the static charge on another portion of the tape.

13. The method according to claim 10, the ion emitter disposed in non-contacting proximity to the recoding tape during the neutralizing the static charge.

14. The method according to claim 10, the on emitter in contact with the recoding tape during the neutralizing the static charge.

15. The method according to claim 10 further comprising:
    sensing the static charge on the recording tape;
    providing a signal in accordance with the sensing; and
    controlling operation of the ion emitter in accordance with the signal.

* * * * *

UNITED STATES PATENT AND TRADEMARK OFFICE
CERTIFICATE OF CORRECTION

| | |
|---|---|
| PATENT NO. | : 8,553,353 B2 |
| APPLICATION NO. | : 13/315982 |
| DATED | : October 8, 2013 |
| INVENTOR(S) | : Michael Ellis et al. |

It is certified that error appears in the above-identified patent and that said Letters Patent is hereby corrected as shown below:

In the Claims

In column 7, line 6, in Claim 1, delete "on" and insert -- ion --, therefor.

In column 7, line 23, in Claim 6, delete "on" and insert -- ion --, therefor.

In column 7, line 27, in Claim 7, delete "on" and insert -- ion --, therefor.

In column 8, line 10, in Claim 10, delete "on" and insert -- ion --, therefor.

In column 8, line 21, in Claim 14, delete "on" and insert -- ion --, therefor.

Signed and Sealed this
Thirty-first Day of December, 2013

Margaret A. Focarino
*Commissioner for Patents of the United States Patent and Trademark Office*